United States Patent
Lee et al.

(10) Patent No.: US 7,392,259 B2
(45) Date of Patent: Jun. 24, 2008

(54) METHOD AND SYSTEM FOR SUPPORTING XQUERY TRIGGER IN XML-DBMS BASED ON RELATIONAL DBMS

(75) Inventors: Myung Cheol Lee, Daejeon (KR); Mi Young Lee, Daejeon (KR); Jong Ho Won, Daejeon (KR); Myung Joon Kim, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 315 days.

(21) Appl. No.: 11/260,073

(22) Filed: Oct. 27, 2005

(65) Prior Publication Data

US 2006/0129575 A1 Jun. 15, 2006

(30) Foreign Application Priority Data

Dec. 14, 2004 (KR) .............. 10-2004-0105516
Apr. 29, 2005 (KR) .............. 10-2005-0036230

(51) Int. Cl.
G06F 17/30 (2006.01)
(52) U.S. Cl. .............. 707/101; 707/102; 707/203; 715/234; 715/239
(58) Field of Classification Search .............. 707/3, 707/100, 101, 102, 203; 715/234, 239
See application file for complete search history.

(56) References Cited

U.S. PATENT DOCUMENTS

| 6,635,089 B1 * | 10/2003 | Burkett et al. .............. 715/513 |
|---|---|---|
| 6,732,095 B1 * | 5/2004 | Warshavsky et al. .......... 707/5 |
| 6,947,945 B1 * | 9/2005 | Carey et al. .............. 707/102 |
| 2002/0120776 A1 * | 8/2002 | Eggebraaten et al. ....... 709/246 |
| 2002/0169788 A1 * | 11/2002 | Lee et al. .............. 707/104.1 |
| 2003/0055829 A1 * | 3/2003 | Kambo et al. .............. 707/100 |
| 2003/0140308 A1 * | 7/2003 | Murthy et al. .............. 715/500 |
| 2003/0182268 A1 * | 9/2003 | Lal .............. 707/3 |
| 2003/0200218 A1 * | 10/2003 | Tijare et al. .............. 707/100 |
| 2004/0044959 A1 * | 3/2004 | Shanmugasundaram et al. .............. 715/513 |
| 2004/0064466 A1 * | 4/2004 | Manikutty et al. .......... 707/100 |
| 2004/0128296 A1 * | 7/2004 | Krishnamurthy et al. .... 707/100 |
| 2004/0167864 A1 * | 8/2004 | Wang et al. .............. 707/1 |
| 2004/0186860 A1 * | 9/2004 | Lee et al. .............. 707/200 |
| 2004/0220912 A1 * | 11/2004 | Manikutty et al. .............. 707/3 |

(Continued)

OTHER PUBLICATIONS

"JDBC Guide: Getting Started," sun.com, Dec. 18, 2002, http://web.archive.org/web/20021218204244/http://java.sun.com/j2se/1.3/docs/guide/jdbc/spec2/jdbc2.1.frame5.html.*

(Continued)

Primary Examiner—James K. Trujillo
Assistant Examiner—Justin Kneitel
(74) Attorney, Agent, or Firm—Ladas & Parry LLP (57) ABSTRACT

A method and system for supporting an XQuery trigger in XML-DBMS based on relational DBMS is provided. In an Ubiquitous environment where XML data are incessantly generated by an enormous number of objects, so as to overcome inconvenience and its resultant reduction of performance in which a user should query after checking a change of XML-DBMS one by one, in XML-DBMS based on relational DBMS, the present invention supports an XQuery trigger technique based on SQL trigger automatically executing insert, update and delete statements, and a storage or external procedure related with the change of data when a change of data is generated at a specific table in a conventional relational DBMS.

13 Claims, 8 Drawing Sheets

U.S. PATENT DOCUMENTS

| | | | |
|---|---|---|---|
| 2005/0165866 A1* | 7/2005 | Bohannon et al. | 707/203 |
| 2006/0173861 A1* | 8/2006 | Bohannon et al. | 707/100 |
| 2006/0173865 A1* | 8/2006 | Fong | 707/100 |
| 2006/0184552 A1* | 8/2006 | Meliksetian et al. | 707/101 |
| 2007/0050392 A1* | 3/2007 | Shukla et al. | 707/102 |

OTHER PUBLICATIONS

"Observable (Java 2 Platform SE v1.4.2)," sun.com, Oct. 10, 2004, http://web.archive.org/web/20041010114157/http://java.sun.com/j2se/1.4.2/docs/api/java/util/Observable.html.*

Mullins, Craig S. "zData Perspectives, DB2 V7 B4 V8," craigsmullins.com, Sep. 2003, http://www.craigsmullins.com/zjdp_004.htm.*

Bonifati, A. et al. "Active XQuery," Mar. 1, 2002, IEEE, Proceedings of the 18th International Conference on Data Engineering.*

Kelley, Brian. "SQL Server's Metadata Views" databasejournal.com, Mar. 15, 2001, http://www.databasejournal.com/features/mssql/article.php/1460131.*

Chen, Z. Jagadishm, H.V. Lakshmanan, L. Paparizos, S. "From Tree Patterns to Generalized Tree Patterns: On Efficient Evaluation of XQuery," 2003, Proceedings of the 29th VLDB Conference.*

Fernandez, M. Tan, W. Suciu, D. "SilkRoute: Trading between Relations and XML," Feb. 24, 2000, Proceedings of the Ninth International World Wide Web Conference.*

Shanmugasundaram, J. Tufte, K. He, G. Zhang, C. DeWitt, D. Naughton, J. "Relational Databases for Querying XML Documents: Limitations and Opportunities," 1999, Proceedings of th 25th VLDB Conference.*

Patil, Priti. Haritsa, Jayant. "Holistic Schema Mappings for XML-on-RDBMS," 2006, Database systems for advanced applications: 11th international conference, DASFAA 2006.*

* cited by examiner

| metadata * | | | | |
|---|---|---|---|---|
| Column Name | Data Type | Length | Allow Nulls | |
| xml_schema_name | varchar | 128 | | |
| xml_schema_file | varchar | 1000 | | |
| sql_table_name_list | varchar | 128 | | |
| mapping_rule_file | varchar | 1000 | | |
| | | | | |
| | | | | |

610 — xml_schema_name
620 — xml_schema_file
630 — sql_table_name_list
640 — mapping_rule_file

```
FOR i IN document("Auction")//Item
WHERE comtains($i/Description, "Bicycle")
RETURN
   <Result_Item>
      {$i/ItemID}
      {$i/Description}
   </Result_Item>
SORTBY(ItemID ASCENDING)
```

```
SELECT i.itemid,i.description
FROM items i
WHERE i.description LIKE '%Bicycle%'
ORDER BY i. itemid ASC
} 800
```

FIG. 9

```
        CREATE TRIGGER t1
        AFTER INSERT ON t1_trigger
        BEGIN
                DELETE * FROM t1_items;        } 930
                INSERT INTO i1_items
900                SELECT i.itemid,i.description
                        FROM items i                  } 920
                        WHERE i.description LIKE'%Bicycle%'
                        ORDER BY i.itemid ASC;
        END;
```
910

FIG. 10

| | Column Name | Data Type | Length | Allow Nulls |
|---|---|---|---|---|
| t1_items | | | | |
| | itemid | int | 4 | |
| | description | varchar | 20 | |

FIG. 11

```
SELECT * FROM t1_items;
```

FIG. 12

```
Observable obj=new Observable();
obj.addObserver(this);
XQExpression expr=conn.createExpression();
XQResuitSequence rs=expr.execute(XQuery_Stmt,Obj);
while(rs.next())
{
        rs.getNode();
}
```
1210, 1200

FIG. 13

```
pubilc class XQResuitSequence
{
    private SQLResuitSetList sqlRSL
}
```
1300, 1310

METHOD AND SYSTEM FOR SUPPORTING XQUERY TRIGGER IN XML-DBMS BASED ON RELATIONAL DBMS

BACKGROUND OF THE INVENTION

1. Field of the Invention

The present invention relates to a method and system for supporting XQuery trigger, and more particularly, to a method and system for supporting XQuery trigger in XML-DBMS based on relational DBMS.

2. Description of the Related Art

As Internet is widely spread, the creation and distribution of XML data are on the rapid increase, consequently, a need for managing a large amount of XML data is increasing. As the managed XML data increases in amount, management functions provided by conventional relational DBMS, such as fast retrieval, multiple user support, backup and restore in failure are required and therefore, researches for the XML-DBMS based on relational DBMS are in active progress.

In recent years, it is expected to be the advent of Ubiquitous environment where all objects with computing capability including human and thing can communicate with each other. In this Ubiquitous environment, a large amount of data are created by a lot of computing objects and are wrapped, exchanged and transmitted in XML format. Among them, there are data processed and wasted upon reception, but a majority of data are required to be stored and managed permanently or temporarily for future use. Accordingly, in the Ubiquitous environment, a requirement for the XML-DBMS is being raised much.

In conventional XML-DBMS, only the primitive functions of traditional relational DBMS have been provided such as storing and managing the finite set of XML data to some degrees), and retrieval for the fixed data set at the request of user), but with only the primitive functions, conventional XML-DBMS is not sufficient for being used in the future Ubiquitous environment, where a large amount of XML data are incessantly created and stored, and real-time retrieval service for the real-time data should be provided.

In other words, for the frequently changed XML-DBMS, real-time retrieval service can't be provided using user request based retrieval function, since user is not able to know whether or not the XML-DBMS is changed without incessant inquiring of the XML-DBMS, therefore user should intervene into the retrieval process so as to receive the real-time retrieval service.

SUMMARY OF THE INVENTION

Accordingly, the present invention is directed to a method and system for supporting XQuery trigger in XML-DBMS based on relational DBMS, which substantially obviates one or more problems due to limitations and disadvantages of the related art.

The goal of the present invention is to provide a method and system for supporting XQuery trigger in XML-DBMS based on relational DBMS, in order to overcome inconvenience and performance degradation that after checking a change of XML-DBMS one by one, a user should query in a Ubiquitous environment where XML data are incessantly generated by an enormous number of objects.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In the present invention, an XQuery trigger technique is proposed based on SQL trigger, which automatically executes insert, update and delete statements, and a storage or external procedure related with the change of data, when a change of data is generated at a specific table in a conventional relational DBMS.

Accordingly, if the user once registers an XQuery trigger query, which the structure of XQuery statement being a standard of an XML query language, to an XML-DBMS, the XQuery trigger registered to the XML-DBMS can be performed automatically upon addition, change and deletion of XML data, and its result can be provided for the user in real-time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
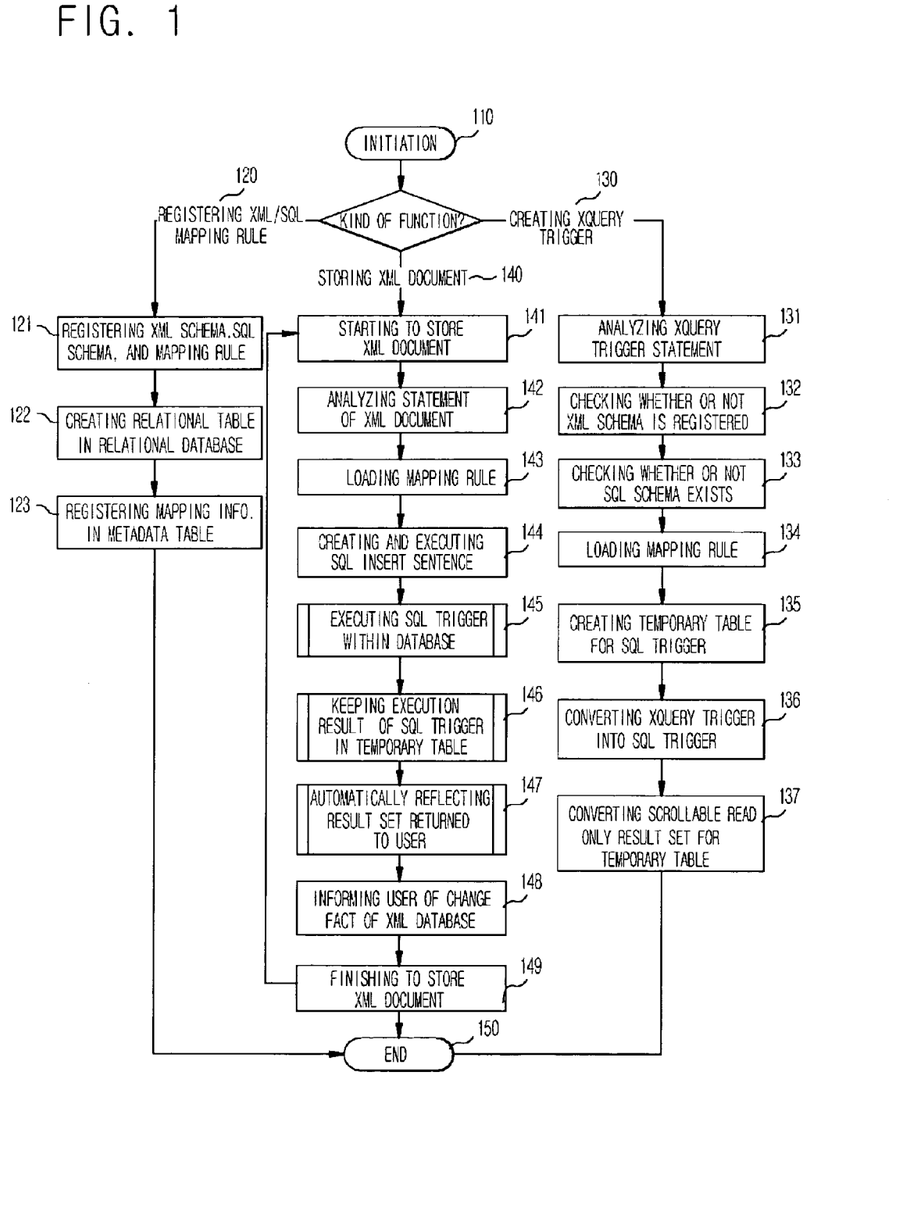
FIG. 1 is a flowchart illustrating a process for an XML-DBMS to interact with a relational DBMS to support XQuery trigger based on SQL trigger of the relational DBMS in XML-DBMS based on relational DBMS.

FIG. 1 is a flowchart illustrating a process of interacting an XML-DBMS with relational DBMS to support XQuery trigger based on SQL trigger of the relational DBMS in the XML-DBMS based on the relational DBMS.

After an initiation step 110 is initiated, a first pathway 120, a second pathway 130, and a third pathway 140 are sequentially progressed as follows. The third pathway 140 is repeated from steps 141 to 149 and is finished in end step 150.

The first pathway 120, the second pathway 130, and the third pathway 140 will be schematically described as follows.

The first pathway 120 is associated with registering the XML/SQL mapping rule.

In the first pathway 120 an XML schema, a mapping rule of the XML schema and the relational DBMS schema are all registered through an XML-DBMS layer, in order to set to provide a function of storing, managing and searching XML data in the relational DBMS.

The second pathway 130 is associated with creating the XQuery trigger.

In the second pathway 130, following a statement structure of the XQuery is a standard XQuery of an XML query language, a user creates the XQuery target through the XML-DBMS layer. A SQL trigger, having the relational DBMS schema as a query target, is subsequently created in a trigger table from the XQuery trigger having the XML schema as the query target. Using the mapping rule of the first pathway a temporary table is created for keeping an execution result of the SQL trigger. Finally, a result set, accessible to all records of the temporary table, is returned to the user.

The third pathway is associated with storing the XML document.

In the third pathway 140, whenever XML data are added, changed or deleted in the XML database layer, the based relational DBMS is automatically changed and the associated SQL trigger is executed. Thereby keeping its result in the temporary table which also changes the XML database and executes the XQuery trigger. Accordingly, the user can gain access to the latest execution result of the XQuery trigger through the result set, which is returned when the XQuery trigger is created in the second pathway 130.

Next, the first pathway 120, the second pathway 130, and the third pathway 140 will be further described in detail.

In the first pathway 120 in step 121, the XML schema, the relational DBMS schema, and the mapping rule of the XML schema are all registered to store, manage and query the XML data in the relational DBMS.

The first pathway 120 functions to inform the XML database of a format of the XML data for storing in the XML-DBMS which is a format of the XML data for storing into the relational DBMS. The first pathway 120 also functions to provide how information is included in an element. The first pathway 120 also attributes how to map XML model with information including a table and a field of the relational DBMS model in order to provide a function of storing, managing and querying the XML data in the relational DBMS having a different data model.

Figure 6:
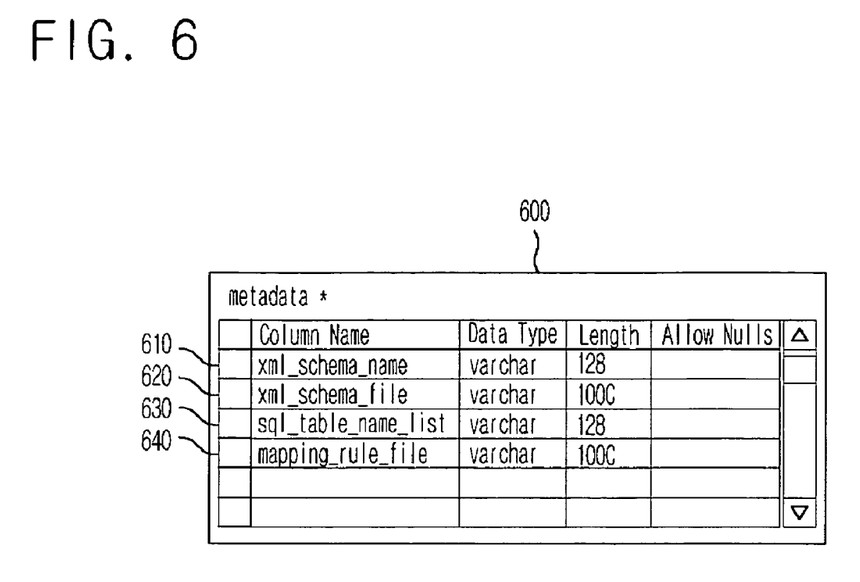
FIG. 6 illustrates a data structure for managing meta data information of an XML schema name, an XML schema file, an associated relational DBMS table name list, and a mapping rule file.

If the user registers the XML schema, the relational DBMS schema, and the mapping rule of the XML schema in the step 121, then the tables for storing and managing the XML data are created from the relational DBMS schema in the relational DBMS (Step 122). The mapping information, such as an XML schema name 610, an XML schema file 620, a corresponding relational DBMS table name list 630, and a mapping rule file 640 of the XML schema and the SQL schema, are then registered to a metadata table 600 as shown in FIG. 6 (Step 230). Here, the metadata table is a system catalogue of a system proposed in the present invention and it is assumed that it has been already created in the database.

At present, the XQuery function in W3C, which is being standardized as an XML query language, provides only a search function for the XML data. Plans also exist to extend the support of the functionalities like storing XML data in XML data storage and changing or deleting the stored XML data in the future. A draft of an XQuery statement for change has been declared in 2002. Accordingly, the XQuery trigger proposed in the present invention is classified as follows, depending on a method of operation on the XML data, using the XQuery statement, within a trigger statement.

Storage XQuery trigger: if the XML database is changed, a change item is processed and new XML data is stored.

Change XQuery trigger: if the XML database is changed, given XML data is changed using information provided from the change item.

Delete XQuery trigger: if the XML database is changed, given XML data is changed using information provided from the change item.

Search XQuery trigger: if the XML database is changed, a query is executed for the object of a total XML data set including the change item, and its result is returned to the user.

In the storage, change and delete XQuery triggers, it is enough that only the XQuery trigger statement is received from the user, and a corresponding XQuery trigger is executed and terminated when the XML database is changed. However in the search XQuery trigger, a method for again returns the result of the executed XQuery trigger to the user, and informs the user of the execution of the XQuery trigger.

Figure 12:
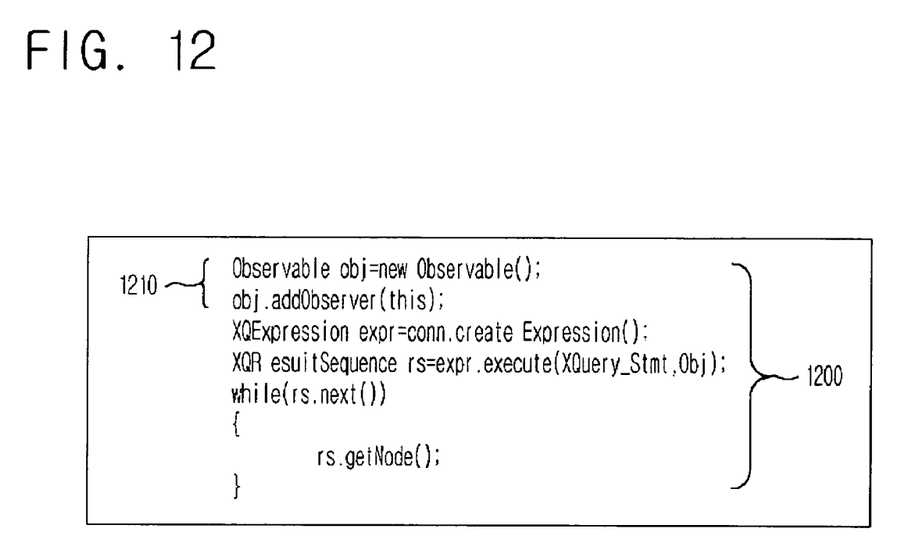
FIG. 12 an embodiment which uses Java language in the case where an XQuery trigger is performed due to the change of an XML database, and an observable object is registered while a search XQuery trigger is created.

In the present invention, the user registers an observable object to the XML-DBMS. Thereby making it possible to notify the user. In an embodiment of the present invention, when it is embodied using Java language, the observable object 1210 may be embodied (1299) as shown in FIG. 12. Further, in the present invention, a method for supporting the search XQuery trigger in the XML-DBMS is described in detail, and the below described XQuery trigger represents the search XQuery trigger.

The second pathway 130 proceeds by creating the XQuery trigger following a statement structure of XQuery is a standard form of an XML query language, and has the XML schema registered in the first pathway 120 as a query-target.

Figure 2:
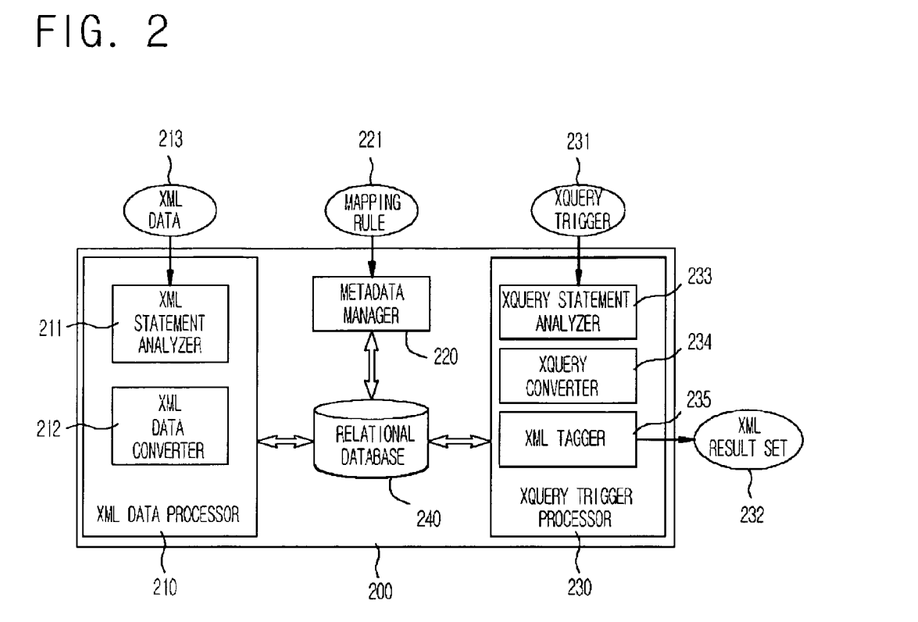
FIG. 2 is a schematic view illustrating a construction of a system designed to provide an XQuery trigger function in XML-DBMS based on a relational DBMS.

Next, if the user inputs the observable object 1210 as a medium for transmitting the XQuery trigger statement and requests the creation of the XQuery trigger, it is analyzed whether or not a statement structure has a syntactic problem (Step 131) according to a statement structure of XQuery, using an XQuery statement analyzer 233, and if not, the XQuery statement trigger is created.

After that XML schema information targeted by the query is extracted from the created XQuery statement tree, a check of whether or not an XML schema has been previously registered in the first (Step 132) is performed. If there is no problem, an XQuery converter loads the mapping rule of the XML schema and the relational DBMS schema registered in the first pathway 120 from the table, and subsequently builds the memory data structure (Step 134), and uses the XQuery statement tree to convert the XQuery trigger into a corresponding SQL trigger statement (Step 136). Subsequently whenever the XQuery trigger is created, the mapping rule of the XML schema and the relational DBMS schema are read from the relational DBMS and are built when the system of the present invention is initially activated, without building-up of the memory data structure. Thereby also being capable of saving time taken for building.

Next, the rigger table to create the SQL trigger statement on is created. The temporary table is also created in the relational DBMS for keeping the execution result of the SQL trigger statement (Step 135). The SQL trigger statement is created in the relational DBMS trigger table, and then the SQL result set is constructed for the temporary table so that the user can access all the records of the temporary table and laps to the XML result set, thereby returning to the user (Step 137).

In the embodiment of the present invention, a construction of the SQL result set can be made by creating a Statement object of JDBC in a type of TYPE_SCROLL_SENSITIVE, CONCUR_READ_ONLY when a connection of the XML-DBMS layer with the relational DBMS is performed using Java DataBase Connectiveity (JDBC). Henceforth, a state of lapping the SQL result set configured for the temporary table to the XML result set is generally called "result set".

The third pathway 140 proceeds with a step of storing the XML data conforming to the XML schema registered in the first pathway 120, in the XML database. This step is repeated (Steps 141 to 149) whenever the XML data is stored.

If the user requests the storing of the XML data (Step 141), the XML data received as an input element is subjected to a statement analysis step (142) through an XML statement analyzer 211 while checking whether it is a well-formed document or the document conforming to the XML schema, and then a Document Object Model (DOM) tree being a standard of an XML document object model is constructed.

The XML data converter 212 loads the mapping rule of the XML schema and the relational DBMS schema registered in the first pathway 140 (Step 143), and constructs the memory data structure, and then converts the DOM tree into the INSERT statement of the SQL (Step 144), and performs the SQL trigger in the relational DBMS (Step 145).

This causes a change of the relational DBMS tables associated with the XML schema and the trigger table created in the second step 150, and causes the execution (Step 145) of the SQL trigger created in the second step within the relational DBMS.

If the SQL trigger is executed (Step 145), its result is kept in the temporary table created in the second pathway (130), and the user can instantly access (Step 147) the result through the result set returned in the second pathway 130.

Figure 9:
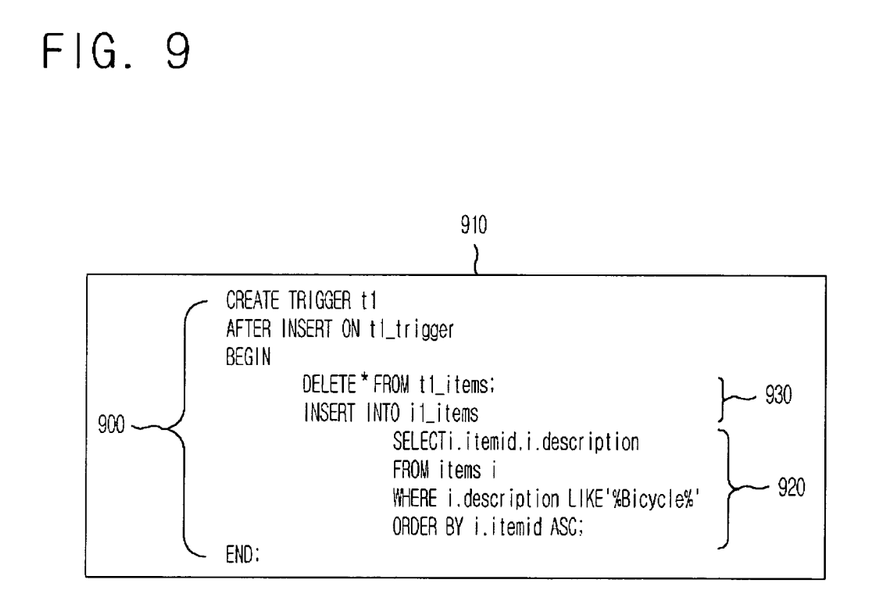
FIG. 9 is an embodiment where the SQL statement of FIG. 8 is converted into an SQL trigger so that its result is stored in a temporary table having a trigger name of t1 and a table name of t1_items.

If there remains previous execution result of the given SQL trigger in the temporary table, all is deleted (Step 930), and then current execution result of the SQL trigger is kept. In this process, the user should know whether the XML database was changed or the XQuery trigger was executed to access the execution result of the SQL trigger using the result set. Therefore, a step (148) of informing the user that the XQuery trigger has been executed is progressed.

A method for notifying the change can be embodied in various methods using various languages. In an embodiment of the present invention, in the use of Java, the user together registers the observable object where himself/herself is registered as an observer, to the XML-DBMS using an observable/observer pattern while creating the XQuery trigger. When the XQuery trigger is executed, the XML-DBMS can invoke a method only for notification predefined in the observable object, thereby informing the observer of the execution fact of the XQuery trigger.

FIG. 2 is a schematic view illustrating a construction of a system designed to provide an XQuery trigger function in the XML-DBMS 200 based on the relational DBMS 240.

The system of the present invention includes a metadata manager 220, an XML data processor 210, and an XQuery trigger processor 230. The metadata manager 220 processes and manages the XML schema, the relational DBMS schema, and the mapping rule 221 of the XML schema and the relational DBMS schema. The XML data processor 210 includes an XML statement analyzer 211 and an XML data converter 212, analyzes and converts the XML data to be stored in the XML-DBMS 200 into the INSERT statement of the SQL.

Last, the XQuery trigger processor 230 includes an XQuery statement analyzer 233, an XQuery converter 234, and an XML tagger 235. The XQuery trigger processor 230 analyzes the XQuery trigger statement 231 created by the user, and then creates the trigger table and the temporary table for the SQL trigger and converts the XQuery trigger statement into the corresponding SQL trigger statement to be created in the relational DBMS 240, and provides the user with the result set for the temporary table. The XML tagger 235 converts the relational result of the SQL trigger, which is automatically executed when the XML data processor 210 stores the XML data, into XML result and provides user with the XML result.

The embodiment will be in more detail described below to be helpful for understanding the method for supporting the XQuery trigger in the XML-DBMS 200 based on the relational DBMS 240 proposed in the present invention.

Figure 3:
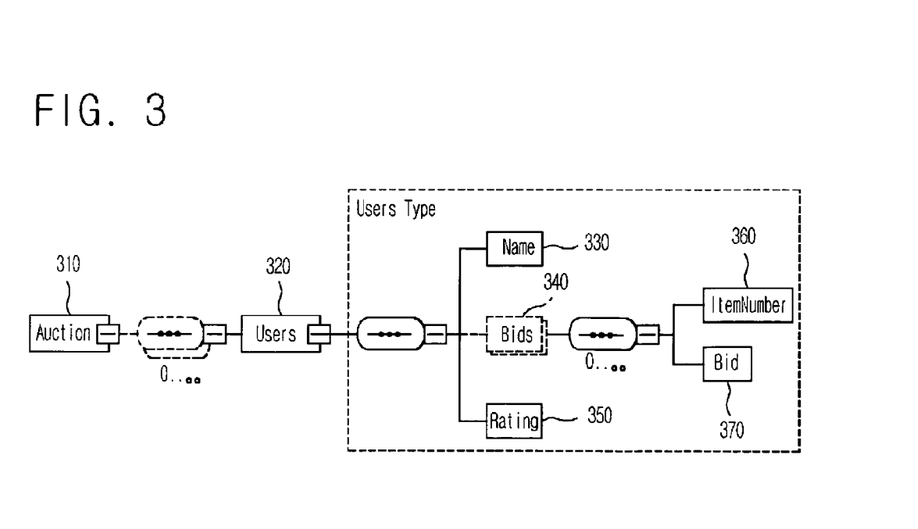
FIG. 3 illustrates an embodiment of an XML schema representing a format of XML data to be stored in XML-DBMS by a user.

FIG. 3 illustrates an embodiment of the XML schema representing a format of the XML data to be stored in the XML-DBMS by the user, and expressing auction information.

The root element of the XML schema is Auction element 310, and the Auction element 310 has zero or more Users elements 320 as a child node. As a child node, the Users element 320 has one Name element 330, zero or more Bids element 350, and one Rating element 340. As a child node, the Bids element 350 has one ItemNumber element 360, and one Bid element 370.

Figure 4:
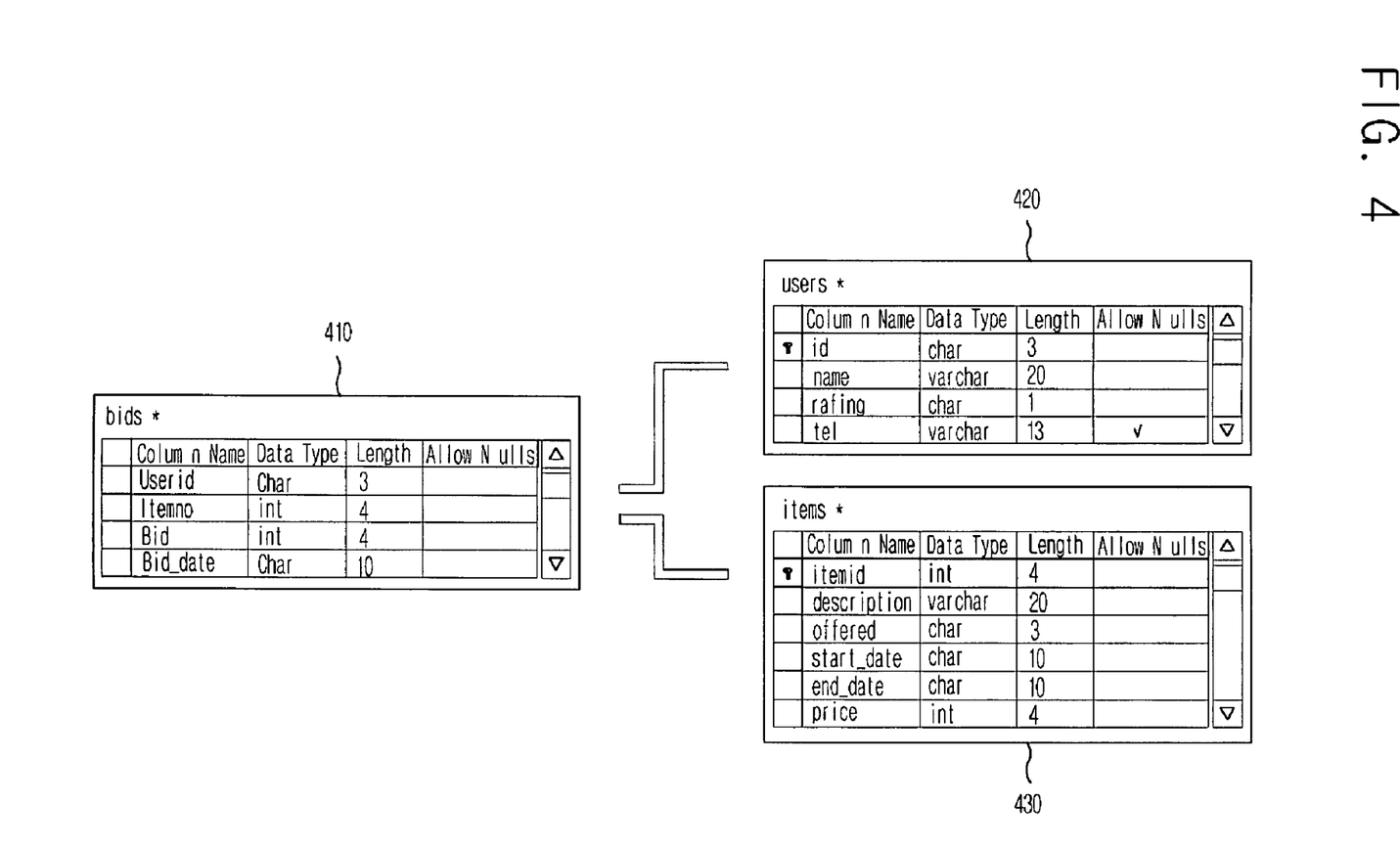
FIG. 4 illustrates an embodiment of an SQL schema representing a table structure of a relational DBMS in which XML data conforming to the XML schema of FIG. 3 is stored.

FIG. 4 illustrates an embodiment of the SQL schema representing the table structure of the relational DBMS 240 in which the XML data 213 conforming to the XML schema of FIG. 3 is stored.

The SQL schema includes a bids table 410, a users table 420, and an items table 430.

Figure 5:
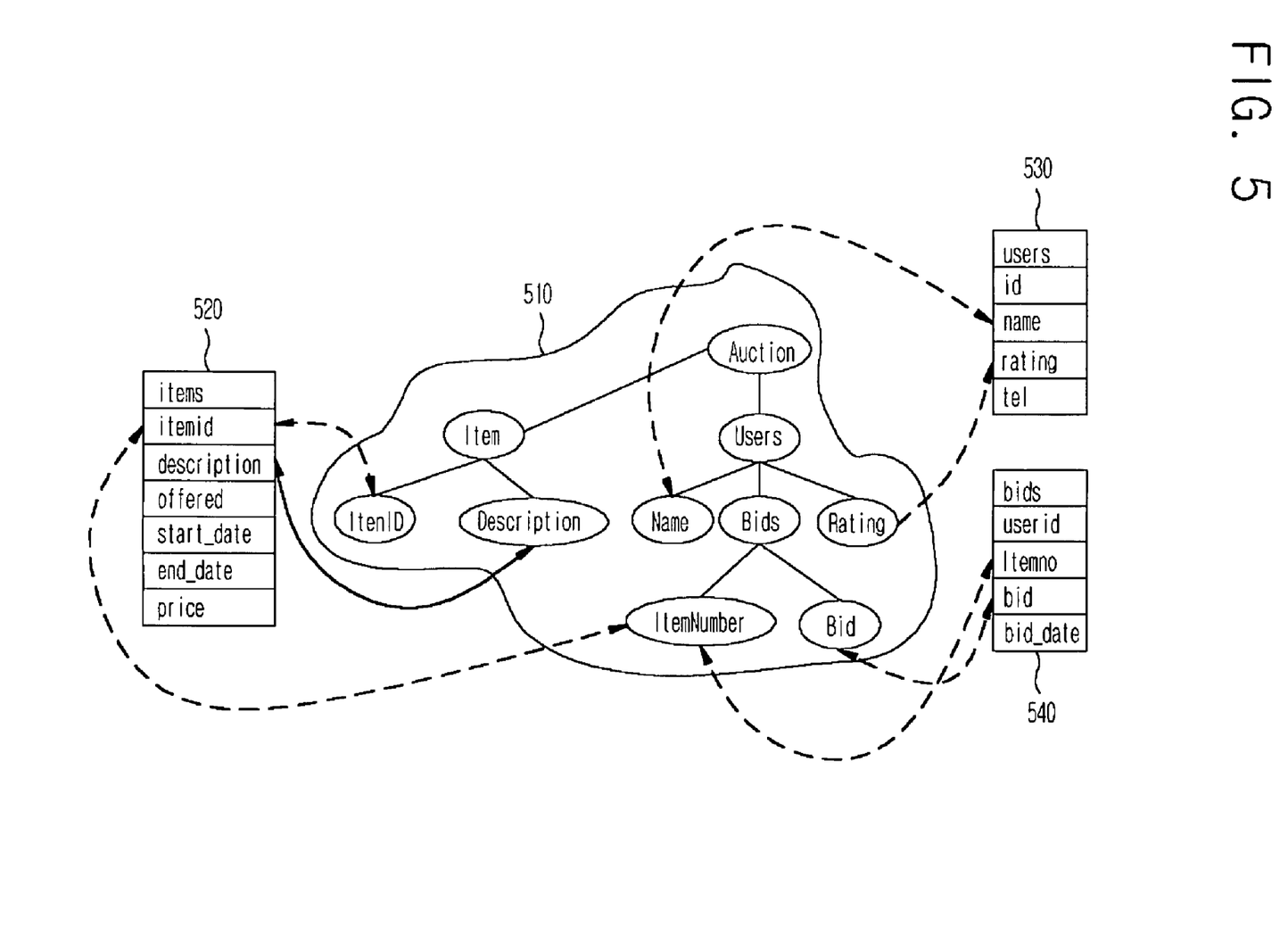
FIG. 5 illustrates an embodiment where a mapping rule of the XML schema of FIG. 3 and the relational DBMS schema of FIG. 4 is expressed using a memory data structure.

FIG. 5 illustrates an embodiment where a mapping rule of the XML schema of FIG. 3 and the relational DBMS schema of FIG. 4 is expressed using the memory data structure, and represents mapping between an auction schema 510 being the XML schema, an items table 520, a users table 530, and a bids table 540 being the relational DBMS schema. For example, an ItemID element of the XML schema has a mapping relation with the itemid field of the items table 520, and a Rating element of the XML schema has a mapping relation with a rating field of the users table 530.

FIG. 6 illustrates a data structure 600 for managing the metadata information of an XML schema name 610, an XML schema file 620, an associated relational DBMS table name list 630, and a mapping rule file 640.

Figure 7:
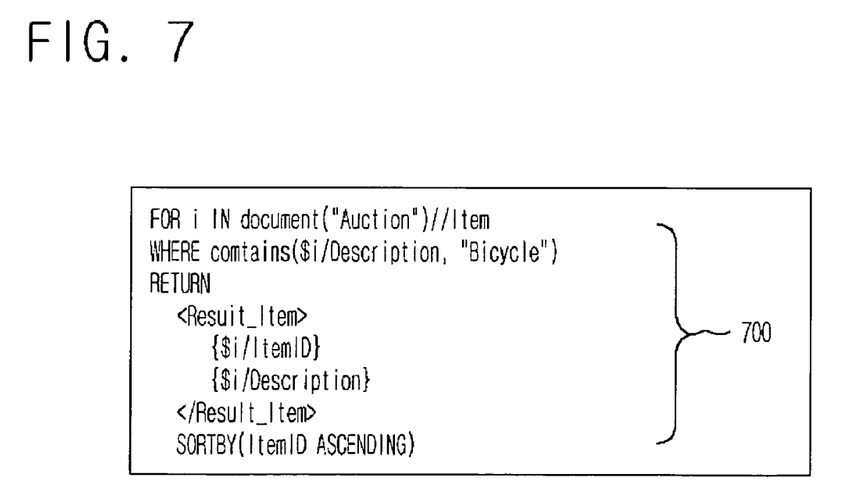
FIG. 7 is an embodiment of a search XQuery trigger to be created by a user for the XML data conforming to the XML schema of FIG. 3.

FIG. 7 is an embodiment of the XQuery trigger supported in the present invention, and represents the XQuery trigger 700 that the user desires to create for the XML data 213 conforming to the XML schema of FIG. 3. It is assumed that a name of the XQuery trigger is "t1" for understanding the drawings referred henceforth.

Describing a meaning of the XQuery trigger statement, in case where "Bicycle" is included in a context of a Description element being the child element among the Item elements of the XML data conforming to the XML schema "Auction", the XQuery statement has a meaning that the ItemID and the Description element are reconstructed into a Result_Item element and a result is returned. The XQuery trigger statement is executed whenever the XML data conforming to the Auction schema is stored in the XML database of the present invention.

Figure 8:
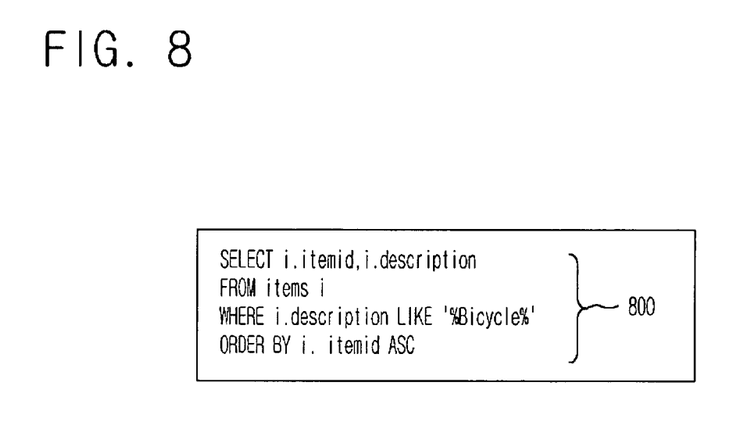
FIG. 8 is an embodiment where an XQuery trigger statement of FIG. 7 is converted into a corresponding SQL sentence using a mapping rule.

FIG. 8 is an embodiment where the XQuery trigger statement of FIG. 7 is converted into a corresponding SQL statement 800 using the mapping rule of FIG. 12. An itemid field and a description field of all the records where a value of the description field includes "Bicycle" are searched from the items table shown in the FIG. 4.

Figure 10:
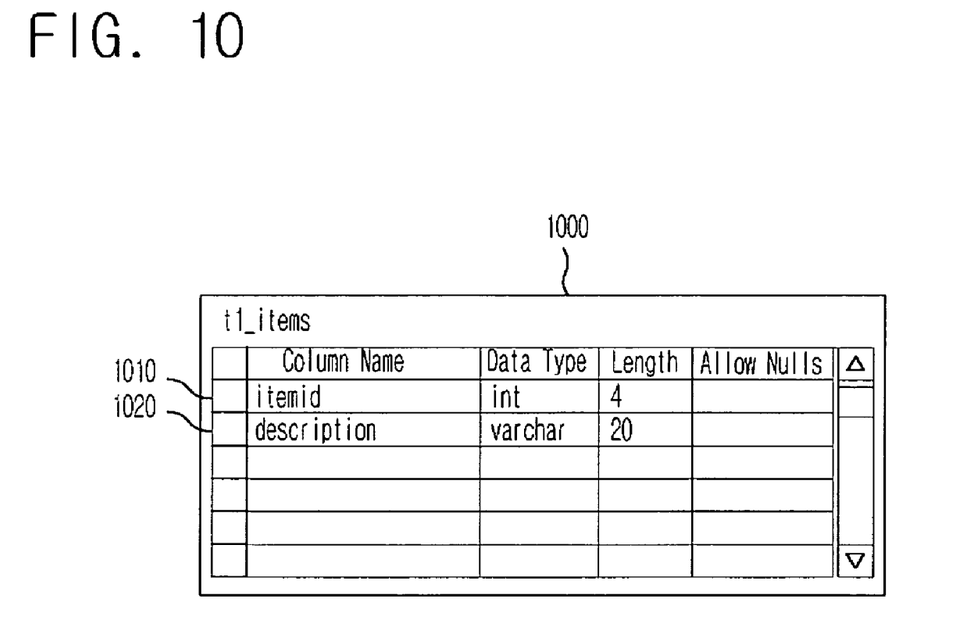
FIG. 10 is an embodiment of a temporary table having t1_items as a table name created to keep an execution result of the SQL trigger of FIG. 9.
Figure 11:
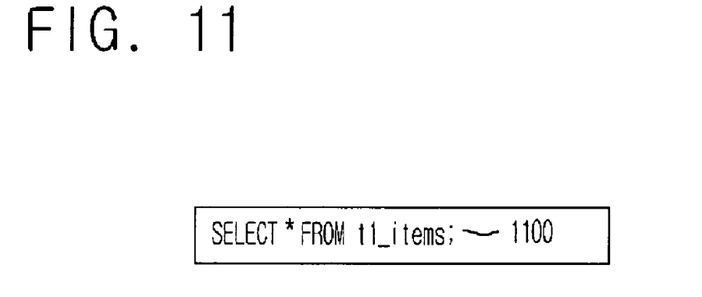
FIG. 11 is an embodiment of an SQL statement for accessing all records of a temporary table having t1_items as the table name of FIG. 10.

FIG. 9 is an embodiment where the SQL statement 800 of FIG. 8 is converted into an SQL trigger 900 having a trigger name of "t1" 910. In the SQL trigger 900, if data is stored and varied in a "t1_trigger" table being the trigger table for the trigger "t1", all the records of the temporary table having the table name "t1_items" are deleted (Step 930), and all the records satisfying the SQL query are searched from the table having the table name of "items" and are kept in the "t1_items table". In this process, the t1_trigger table being the trigger table for the creation of the SQL trigger 900 is created, and also the temporary table 1000 having the table name "t1_items" of FIG. 10 for keeping the execution result. After the temporary table 1000 having the table name "t1_items" is made, the SQL trigger 900 having a "t1" 910 as the trigger name of FIG. 9 is created in the t1_trigger table of the relational DBMS, and as shown in FIG. 11, the SQL statement 1100 for accessing all the records of the temporary table 1000 having the table name t1_items is executed, and its resultant empty result set 1310 is lapped (1300) using XML and returned to the user.

Figure 13:
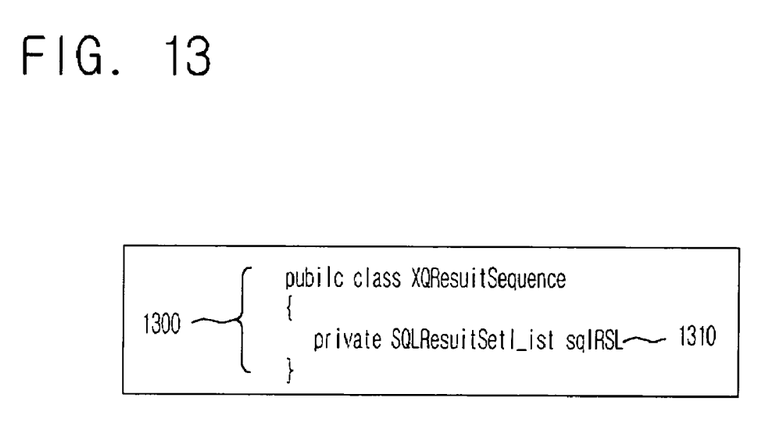
FIG. 13 is a schematic data structure of an XML result set proposed in the present invention to lap a relational result set of a relational DBMS and provide an XML result set to a user.

Since one XML schema can be mapped related with several relational DBMS, one XML result set 1300 can have several SQL result set 1310 and accordingly, the user of the XQuery trigger can use one XML result set irrespective of a mapping relation of the XML schema and the relational DBMS schema, and transparently access the execution result of the XQuery trigger.

In an embodiment of the present invention, in case where the JDBC is used for the connection with the relational DBMS, the statement is created using the following:

Statement stmt=conn.createStatement(ResultSet.TYPE_SCROLL_SENSITIVE, ResultSet.CONCUR_READ_ONLY);

, and if one query is executed and "ResultSet" is received, even though data is changed after the execution of the query, the updated query execution result can be continuously accessed through the "ResultSet" of the JDBC previously received.

The query result of the XML database should be provided as the XML data set and therefore, the XML result set lapping the result set of the relational DBMS is provided to the user, and when the user obtains a specific XML document from the XML result set, the tuple of the relational DBMS is converted into the format of the XML data, and provided to the user.

As described above, whenever the XML data is stored into an XML-DBMS) and the XML database is changed through the processes up to now, the XQuery trigger is executed, and its result can be accessed through the XML result set by the user, but there should be still provided a method for informing of the user whenever the XQuery trigger is executed.

For this, in application program creating the XQuery trigger, if the observable object is created, and the application program itself is registered as the observer of the observable object and then the XQuery trigger is created while being given to the XML-DBMS proposed in the present invention with the observable object, the XML-DBMS can get to notify all the observers of the observable object when the XML-DBMS is changed.

In an embodiment of the present invention of FIG. 12, the inventive system is embodied (1200) using the Java language, the observable/observer pattern provided in the Java language is applied and the observable object 1210 is registered to the XML database, thereby notifying the user of the execution of the XQuery trigger, that is, user's monitoring the change item of the XML-DBMS becomes possible.

As described above, the present invention is to provide a technique for supporting the XQuery trigger using the SQL trigger in the XML-DBMS based on the relational DBMS, and monitoring its execution result.

As described above, the inventive method and system for supporting the XQuery trigger in the XML-DBMS based on the relational DBMS, provides the XQuery trigger) technique for automatically executing the query depending on the change of the XML data, not for query execution by user's request, and monitoring a result of the automatic query execution, thereby providing an effect of solving a drawback of being capable of in real time searching the frequently changed XML-DBMS using a searching function based on the user's request. In other words, since the user can know whether or not the XML-DBMS is changed, the user does not need to incessantly intervene in the retrieval process so as to receive a real-time retrieval service.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for supporting an XQuery trigger in XML-DBMS based on a relational DBMS, the method comprising:

registering an XML schema, a relational DBMS schema, and a mapping rule of the XML schema and of the relational DBMS schema through an XML database layer so as to store, manage and search XML data in the relational DBMS schema;

creating a XQuery trigger using standard XML query language and using the registered XML schema as a XQuery target;

converting the XQuery trigger into a corresponding SQL trigger having the relational DBMS schema as a query target;

reading the mapping rule of the XML schema and of the relational DBMS schema to initially build a memory data structure;

storing the SQL trigger into a trigger table;

recording a SQL result set into a temporary table;

mapping the recorded SQL result set in the temporary table to a corresponding XML result set so that the user can access the latest result set of the automatically executed XQuery trigger;

requesting to store XML data into the relational DBMS schema;

making a Document Object Model (DOM) tree wherein the DOM tree is made in a standard format of an XML document object model of the XML data;

loading the mapping rule of the XML schema and of the relational DBMS schema;

adding the XML data into the memory data structure;

converting the DOM tree into an INSERT statement of the SQL trigger;

executing the SQL trigger in the relational DBMS schema which changes the trigger and temporary tables associated with the relational DBMS schema and the XML schema; and informing the user that a change of the XML database and a change in the execution of the XQuery trigger has occurred whenever the XML data in the memory data structure is changed wherein the user can gain access to the latest execution result of the XQuery trigger through the XML result set that is returned when the XQuery trigger is created, whereby a query is automatically executed depending on the change of the XML data, and its result is monitored.

2. The method of claim 1, wherein the first further comprises:

creating an SQL table for storing and managing the XML data in the relational DBMS schema after registering the mapping rule of the XML schema; and registering mapping information including an XML schema name, an XML schema file, a corresponding relational DBMS table name list, and a mapping rule file of the XML schema and of an SQL schema to a metadata table.

3. The method of claim 1 further comprising:

creating an XQuery trigger after registering the XML schema so that a statement structure of XQuery uses standard XML query language; and analyzing the statement structure of the XQuery to create an XQuery statement tree if there is no problem in the analysis;

extracting XML schema information as the target for the query in the created XQuery statement tree;

checking whether or not the XML schema is previously registered;

checking whether or not the SQL schema associated with a corresponding XML schema exists in the relational DBMS, and loading the registered mapping rule from the metadata table to build the memory data structure;

traversing the XQuery statement tree while converting the XQuery trigger into the SQL trigger;

creating the trigger table for creating the SQL;

creating the temporary table for keeping the execution result of the SQL trigger in the relational DBMS schema; and creating the SQL trigger by constructing an SQL result set for the temporary table so that the user can access all the records of the temporary table, lapping the constructed SQL result set to the XML result set; and returning the XML result set to the user.

4. The method of claim 3, wherein the user requests the creation of the XQuery trigger, by inputting an observable object as a medium, for informing a change of the XML-DBMS to the user.

5. The method of claim 3, wherein the memory data structure is built when a system is initially activated without re-creating the XQuery trigger.

6. The method of claim 1 further comprising:

storing the XML data conforming to the registered XML schema in the XML-DBMS;

constructing the DOM tree using statement analysis process of the XML data received as an input element when the user requests storage of the XML data; and loading the registered mapping rule and constructing the memory data structure from the register mapping rule; and storing the converted DOM tree in the relational DBMS schema.

7. The method of claim 6, wherein the converting and storing the DOM tree changes relational DBMS tables associated with the XML schema and the trigger table, and causes an execution of the SQL trigger within the relational DBMS, and keeps the SQL trigger execution result the temporary table created which is automatically reflected in the XML result set.

8. The method of claim 1, wherein the XQuery trigger is classified as selected from the group consisting of a storage XQuery trigger, a change XQuery trigger, a delete XQuery trigger, and a search XQuery trigger, wherein, the storage XQuery trigger is for processing a change item and storing new XML data when the XML schema is changed, the change XQuery trigger is for changing other XML data using information provided when the XML schema is changed, the delete XQuery trigger is for deleting other XML data using information provided when the XML schema is changed, and the search XQuery trigger the for executing a query for an object of a total XML data set when the XML schema is searched and for returning its result to the user.

9. The method of claim 8, wherein execution results of the XQuery trigger are returned after the search XQuery trigger is used.

10. A system for supporting an XQuery trigger in XML-DBMS based on a relational DBMS, the system having a processor and a memory coupled to the processor, the system comprising:

a metadata manager for registering an XML schema, a relational DBMS schema, and a mapping rule of the XML schema and of the relational DBMS schema through an XML database layer so as to store, manage and query XML data in the relational DBMS schema an XML data processor for creating a XQuery trigger using standard XML query language and using the registered XML schema as a XQuery target, for converting the XQuery trigger into a corresponding SQL trigger having the relational DBMS schema as a query target, for reading the mapping rule of the XML schema and of the relational DBMX schema to initially build a memory data structure, for storing the SQL trigger into a trigger table, for recording a SQL result set into a temporary table, and for mapping the recorded SQL result set in the temporary table to a corresponding XML result set so that the user can access the latest result set of the automatically executed XQuery trigger; and an XQuery trigger processor
for requesting to store XML data into the relational DBMS schema,
for making a Document Object Model (DOM) tree wherein the DOM tree is made in a standard format of an XML document object model of the XML data,
for loading the mapping rule of the XML schema and of the relational DBMX schema,
for adding the XML data into the memory data structure;
for converting the DOM tree into an INSERT statement of the SQL trigger,
for executing the SQL trigger in the relational DBMS schema which changes the trigger and temporary tables associated with the relational DBMS schema and the XML schema, and
for informing the user that a change of the XML database and a change in the execution of the XQuery trigger has occurred whenever the XML data in the memory data structure is changed wherein the user can gain access to the latest execution result of the XQuery trigger through the XML result set that is returned when the XQuery trigger is created, whereby a query is automatically executed depending on the change of the XML data, and its result is monitored.

11. The system of claim 10, wherein the XML data processor further comprises an XML statement analyzer and an XML data converter.

12. The system of claim 10, wherein the XQuery trigger processor further comprises an XQuery statement analyzer, an XQuery converter, and an XML tagger.

13. The system of claim 12, wherein the XML tagger for storing the XML data through the XML data processor while converting a result of tuple format of the automatically executed SQL trigger in a format of the XML data, and for providing the converted result to the user.

* * * * *